May 10, 1927.
F. BACHMANN
1,627,550
SEPARATION OF SOLIDS FROM LIQUIDS
Filed March 28, 1923    2 Sheets-Sheet 1
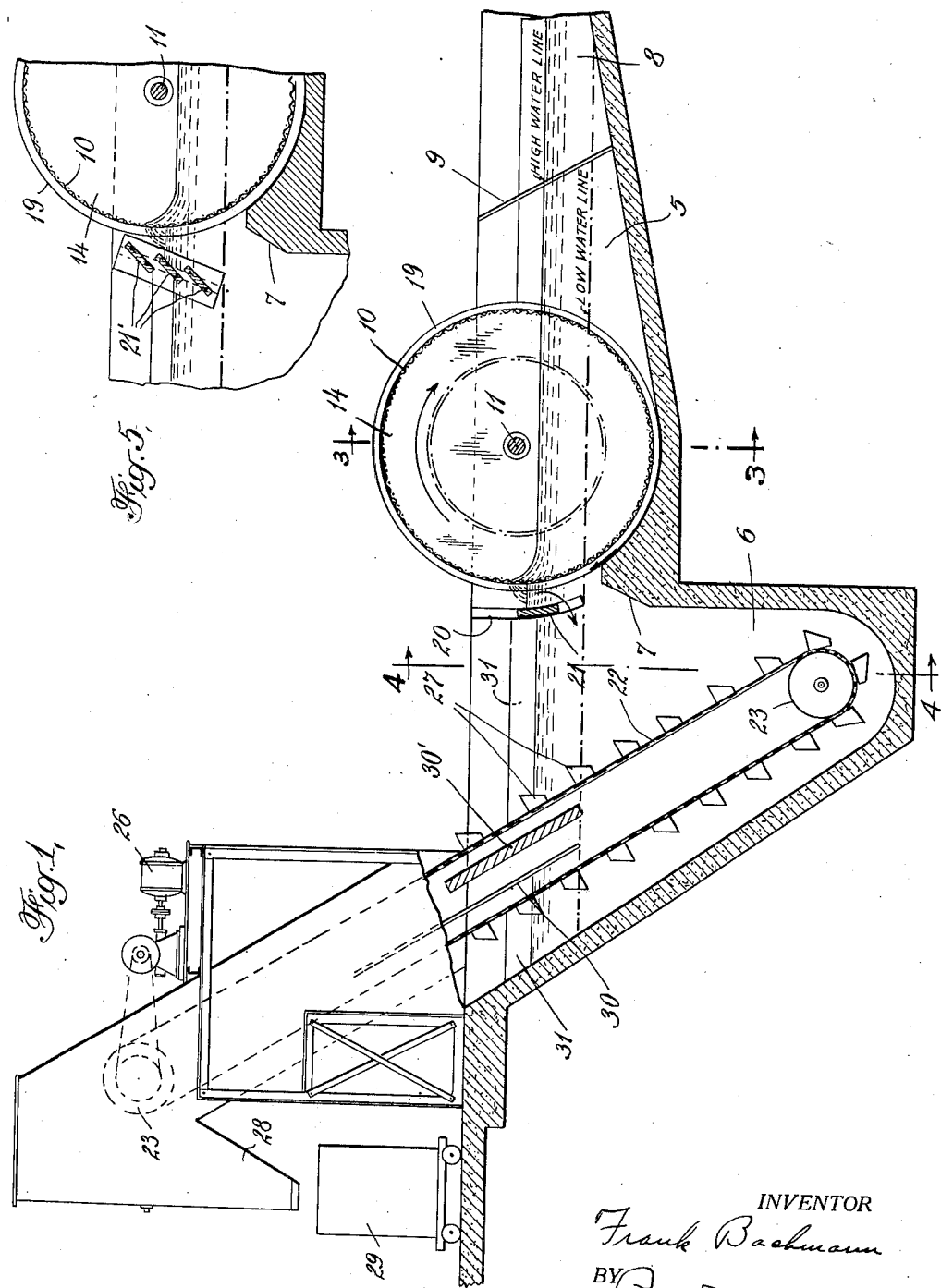
INVENTOR
Frank Bachmann
BY
Pennie Davis Marvin & Edmonds
his ATTORNEYS

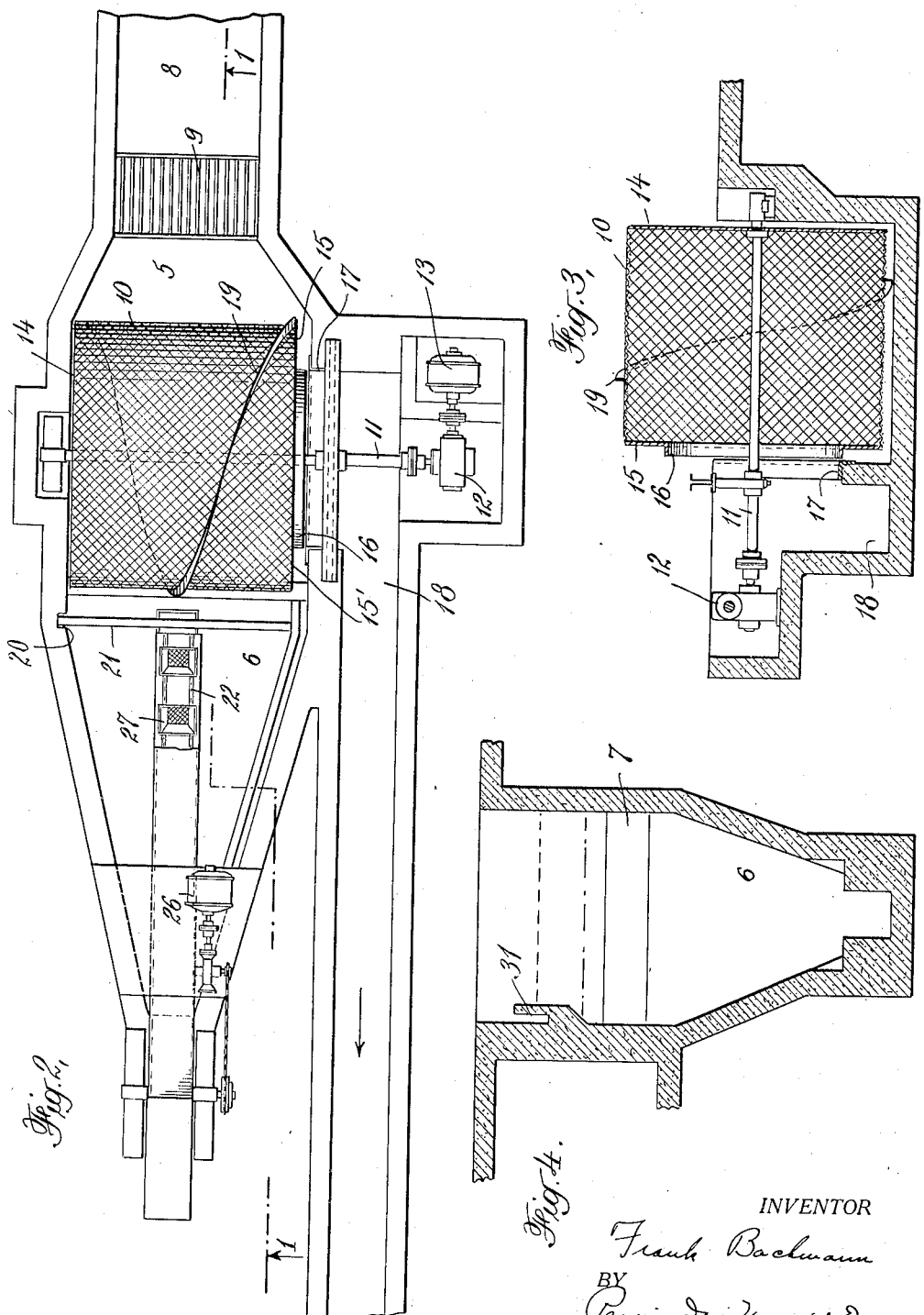

Patented May 10, 1927.

1,627,550

UNITED STATES PATENT OFFICE.

FRANK BACHMANN, OF NEW YORK, N. Y., ASSIGNOR TO THE DORR COMPANY, OF NEW YORK, N. Y., A CORPORATION OF DELAWARE.

SEPARATION OF SOLIDS FROM LIQUIDS.

Application filed March 28, 1923. Serial No. 628,199.

This invention relates to the separation of solid particles from liquid, and particularly to improvements in a method and apparatus whereby the separation may be accomplished in an effective and economical manner. In general my invention follows the method and apparatus described in the patent of Charles Lee Peck, 1,449,622, but it introduces certain improvements which result in increased effectiveness and utility.

The invention is applicable to the separation of solid particles of any kind from liquid. It has particular utility, however, in the treatment of sewage, trade waste liquors and the like. Domestic or municipal sewage, trade waste liquors and similar materials contain varying amounts of solid particles, and it is frequently desirable or necessary to separate such particles from the liquid. The solids may be valuable because of useful constituents or may constitute an undesirable contamination of the liquid so that removal of the solids facilitates the further treatment or use of the liquid.

The separation is accomplished preferably by means of a rotating foraminous cylinder or screen which permits the passage of the liquid through its interstices and escape thereof by a suitable outlet. The screen is mounted in a receptacle or chamber to which liquid containing the solid particles is fed. The solid particles settle in the receptacle or are retained at the surface of the screen. As the solid particles accumulate they are progressively delivered to a second receptacle or pit which also contains liquid. The solid particles settle in the pit and are withdrawn therefrom continuously or otherwise, suitable provision being made for draining the liquid therefrom.

Prior to my invention screening apparatus has been so arranged that a line of demarcation existed between the screening chamber and the screenings pit. In such apparatus there is a tendency for fine solid particles and grease to accumulate between the lip of the screening chamber and the screen, and this accumulation eventually clogs the perforations in the screen, making the apparatus ineffective. The efficiency of the apparatus is also reduced by the fluctuations of liquid level in the screening chamber. While it is desirable that the liquid level remain constant to insure efficient operation, it is impracticable because the flow is frequently variable and results in differences in level of the liquid of eighteen inches or more in ordinary practice.

It is the object of the present invention to overcome the disadvantages of screens as heretofore known and to provide an apparatus which will operate efficiently by avoiding accumulations of fine material and grease on the screen, variations in level of the liquid in the screening chamber being permissible without interfering with the screening operation.

Further objects and advantages of the invention are the reduction of the comminution of the solids by the action of the screen, the elimination of slapping and splashing of the liquid in the screening chamber and the return of clear liquid from the screenings pit to the screening chamber.

Further objects and advantages of the invention will be apparent as it is better understood by reference to the following specification and accompanying drawing, in which Fig. 1 is a longitudinal section through the apparatus;

Fig. 2 is a plan view thereof;

Fig. 3 is a section on the line 3—3 of Fig. 1;

Fig. 4 is a section on the line 4—4 of Fig. 1; and

Fig. 5 is a detail in section showing a different form of baffle.

In carrying out the invention I provide for the removal of fine particles and grease from the screen by maintaining a current which carries this material into the pit. Preferably I employ a baffle between the screening chamber and the screenings pit, the baffle being spaced from the lip of the screening chamber and from the screen. As the screen rotates at a relatively high peripheral speed, preferably 150 to 400 lineal feet per minute, the hydrostatic head created on the inner side of the screen above the point of emergence thereof from the surrounding liquid causes the solids accumulated on the surface to fall therefrom between the baffle and the screen. The liquid discharged at this point raises the level of the liquid behind the baffle above the general level of the liquid in the screening chamber and pit, and the discharged solids are caused to flow into the pit by the current thus created. The general tendency of this current is downward, but the depth of the baffle is such that after passing it the liquid rises and creates a gentle surface current while the solid particles sink.

If a substantially constant liquid level were maintained in the chamber and pit, the baffle could be fixedly mounted. Means could be readily provided to maintain a constant liquid level, but it is preferable to permit variation thereof. The desired results under variations of liquid level may be accomplished by employing a floating baffle which readily accommodates itself to changes in level of the liquid. The baffle may be supported in any desired manner so that in rising and falling with the liquid level it is maintained in suitably spaced relation with the screen and prevented from contacting with the lip of the screening chamber. It is desirable that a space of not materially less than four inches be maintained at all times between the lower edge of the baffle and the lip.

The screenings chamber is designed to prevent settling therein but heavier solids which settle in the screening chamber are transferred to the pit by a spiral fin carried on the outer surface of the screen. The depth of the fin is slightly less than the clearance between the screen and the bottom of the chamber, and as the screen rotates the settled material is carried forwardly and over the lip into the pit. Since the spiral fin acts continuously on the solid particles, shocks and jars which might injure the screen bearings and splashing of the liquid are avoided.

The solid particles settle in the pit and are lifted therefrom by a suitable elevator provided with draining buckets. The supernatant liquid remains substantially clear unless disturbed, and to prevent splashing of the liquid draining from the elevator buckets a splash board is supported beneath the elevator and extends preferably below the level of the liquid. A baffle also extends entirely across the pit to prevent floating scum from passing the conveyer. The baffle may float in the liquid. The scum is gradually picked up by the conveyer buckets and removed with the other solid particles.

At the side of the pit a conduit is provided into which the liquid flows and by which it is returned to the screening chamber. The open end of the conduit is behind the second baffle so that floating scum cannot return with the liquid. The conduit should have a depth approximately equal to the variation in liquid level in the screening chamber and pit, the open ends of the conduit having a similar depth so that the liquid will return to the screening chamber continuously throughout the operation. A constant circulation of liquid is thus maintained, the liquid flowing with the solid particles into the pit and returning through the conduit. The conduit reduces the tendency of liquid to return beneath the baffle and thereby interrupt the current which carries the solids into the pit.

It will be observed that the invention depends primarily upon the sweeping action of the current particularly that set up between the baffle and the lip of the screening chamber by the hydrostatic head resulting from the higher liquid level behind the baffle. This sweeping action insures the removal of fine particles and grease from the screen and continuous operation of the device with mechanical efficiency. A certain amount of air is entrained by the liquid falling behind the baffle, and the aeration causes fatty particles to agglomerate and float as a scum. When a sufficient proportion of fat is contained in the liquid this scum may be separated for the recovery of its valuable constituents.

Referring to the drawing, 5 indicates the screening chamber and 6 the pit which may be constructed of reinforced concrete or other suitable material. Both the chamber and pit are filled with liquid which may vary in level as indicated by the high and low water lines on the drawing. The chamber and pit are separated only by a lip 7 which, as indicated, does not extend above the lower water line. The liquid is fed to the screening chamber through an inlet passage 8 in which a bar screen 9 is supported to prevent the entrance of material which might injure the mechanism. A foraminous cylinder or screen 10 is supported in the screening chamber upon a shaft 11 which is driven through power-transmitting devices 12 from a motor or other source of power 13. The end 14 of the screen is closed and the end 15 consists of an annular disc 15' having an outwardly extending flange 16 thereon. The edge of the flange 16 is spaced slightly from a stationary annular collar 17 which forms the inlet of a discharge conduit 18. Thus, as the screen rotates, the liquid flows through the interstices thereof and escapes continuously to the outlet 18. A spiral fin 19 supported on the surface of the screen engages any solid particles in its path and carries them toward the lip 7 over which they fall into the pit 6.

Above the lip 7 the walls of the pit are preferably slotted at 20 or guideways are otherwise formed for a baffle 21 which floats in the liquid and rises and falls with the change in level thereof. The guideways are shaped so that the baffle is spaced a substantially constant distance from the screen as the baffle rises and falls, and the baffle is prevented from engaging the lip. The purpose of the baffle, as hereinbefore stated, is to induce a current of liquid in the direction of the pit. As the screen rotates in the direction indicated by the arrow, the hydrostatic head is created adjacent the point of emergence and the liquid flowing outwardly through the screen carries with it the finer particles which have accumulated on the surface. This liquid falling behind the baffle causes a hydrostatic head at this point and this in turn creates the current flowing downwardly between the lower edge of the baffle and the lip of the screening chamber. The depth of the baffle is such as to cause the liquid to flow in the direction indicated by the arrows in Fig. 1. The current thus carries the solid particles into the pit and then rises to the surface, creating a gentle surface current which carries any scum away from the screen. Instead of the floating baffle, a series of fixed baffles 21, as shown in Fig. 5, may be used. These baffles are arranged in parallel relation and spaced apart. A portion of the liquid flows out between the baffles, and the arrangement is particularly advantageous because it tends to increase the surface current which carries the scum away from the screen.

An elevator 22, preferably of the endless chain type, is mounted in the pit, sprockets or other means 23 being provided to support the conveyer. The conveyer may be driven through power-transmitting mechanism from a motor 26 or other suitable source of power. Preferably the conveyer is mounted with draining buckets 27 which lift the solid particles and permit the liquid to escape therefrom. The buckets may discharge into a chute 28 which delivers the solid particles to any suitable form of conveyer such as a car 29.

To prevent splashing of the liquid draining from the conveyer, a drain board 30 extends across the pit and beneath the surface of the liquid therein. A baffle 30′ is provided to prevent the scum on the surface of the liquid from passing the conveyer. This baffle coöperates with the baffle 21 which directs the liquid current toward the conveyer. The current causes the scum to accumulate in the path of the conveyer. The scum is picked up by the buckets and delivered with the solid material.

A conduit 31 is provided at one side of the pit and screening chamber, one end of the conduit being open behind the baffle 30′ and the other end opening into the screening chamber. The depth of this conduit corresponds to the distance between the high and low water lines so that liquid will flow continuously from the pit to the screening chamber. This liquid is substantially clear since the solid particles have separated therefrom in the quiet zone behind the baffle 30′ which prevents scum from reaching this zone.

The method and apparatus described are particularly advantageous in that they permit continuous operation in handling materials which otherwise have a tendency of clogging the screen. The time otherwise lost in intermittently cleaning the screen is saved in the operation of the present method and apparatus, and the efficiency thereof is accordingly materially improved. The separation of the solids from the liquid is accomplished with great rapidity, permitting the handling of large volumes of liquid at a minimum of expense and the recovery of the solid particles with a low water content.

Other advantages than those enumerated result from the application of the invention, and various changes may be made in the details thereof without departing from the invention or sacrificing the advantages thereof.

I claim:—

1. In an apparatus for removing solid particles from liquid containing the same, the combination of a rotatable screen and means disposed outside the screen in spaced relation and cooperating therewith to prevent the accumulation of solid particles on the screen by the sweeping action of a current below the surface of the liquid.

2. In an apparatus for removing solid particles from liquid containing the same, the combination of a rotatable screen and a baffle independent of the screen and cooperating therewith to prevent the accumulation of solid particles on the screen by creating a sweeping current below the surface of the liquid.

3. In an apparatus for removing solid particles from liquid containing the same, the combination of a rotatable screen and a floating baffle extending parallel to the axis of rotation of the screen and cooperating therewith to prevent the accumulation of solid particles on the screen.

4. In an apparatus for removing solid particles from liquid containing the same, the combination of a rotatable screen, a floating baffle extending parallel to the axis of rotation of the screen and cooperating therewith to prevent the accumulation of solid particles on the screen and means for limiting the movement of the baffle.

5. In an apparatus for removing solid particles from liquid containing the same, the combination of a rotatable screen, a receptacle, in which the screen rotates, having a lip at the discharge side thereof, and means disposed outside the screen in spaced relation and cooperating with the screen and lip to create a current below the surface of the liquid and thereby prevent accumulation of solid particles on the screen.

6. In an apparatus for removing solid particles from liquid containing the same, the combination of a rotatable screen, a receptacle, in which the screen rotates, having a lip at the discharge side thereof and a baffle cooperating with the screen and lip to prevent accumulation of solid particles on the screen.

7. In an apparatus for removing solid particles from liquid containing the same, the combination of a rotatable screen, a receptacle, in which the screen rotates, having a lip at the discharge side thereof and a floating baffle cooperating with the screen and lip to prevent accumulation of solid particles on the screen.

8. In an apparatus for removing solid particles from liquid containing the same, the combination of a rotatable screen, a receptacle, in which the screen rotates, having a lip at the discharge side thereof and a floating baffle cooperating with the screen and lip to prevent accumulation of solid particles on the screen, and means for preventing the baffle from engaging with the lip of the receptacle.

9. In an apparatus for removing solid particles from liquid containing the same, the combination of communicating receptacles adapted to contain liquid, a rotatable screen in one of the receptacles, and means disposed outside the screen in spaced relation and cooperating therewith to facilitate discharge of the solid particles into the other receptacle by the sweeping action of a current below the surface of the liquid.

10. In an apparatus for removing solid particles from liquid containing the same, the combination of communicating receptacles adapted to contain liquid, a rotatable screen in one of the receptacles, and a baffle cooperating with the screen to facilitate discharge of the solid particles into the other receptacle by the sweeping action of a current below the surface of the liquid.

11. In an apparatus for removing solid particles from liquid containing the same, the combination of communicating receptacles adapted to contain liquid, a rotatable screen in one of the receptacles and a floating baffle cooperating with the screen to facilitate discharge of the solid particles into the other receptacle by the sweeping action of a current of the liquid.

12. In an apparatus for removing solid particles from liquid containing the same, the combination of communicating receptacles adapted to contain liquid, a rotatable screen in one of the receptacles, means cooperating with the screen to facilitate discharge of the solid particles into the other receptacle and a conduit permitting return of the liquid to the first receptacle.

13. In an apparatus for removing solid particles from liquid containing the same, the combination of communicating receptacles adapted to contain liquid, a rotatable screen in one of the receptacles, means for delivering solid particles to the other receptacle, means for withdrawing solid particles from the latter receptacle, and means for substantially preventing disturbance of the liquid by the removal of the solid particles.

14. In an apparatus for removing solid particles from liquid containing the same, the combination of communicating receptacles adapted to contain liquid, a rotatable screen in one of the receptacles, means for delivering solid particles to the other receptacle, means for withdrawing solid particles from the latter receptacle, and a splash board beneath the withdrawing means to substantially prevent disturbance of the liquid by the removal of the solid particles.

15. In an apparatus for removing solid particles from liquid containing the same, the combination of communicating receptacles adapted to contain liquid, a rotatable screen in one of the receptacles, means for delivering solid particles to the other receptacle, means for withdrawing solid particles from the latter receptacle, means for substantially preventing disturbance of the liquid by the removal of the solid particles, and means for returning liquid to the screen-containing receptacle.

16. In an apparatus for removing solid particles from liquid containing the same, the combination of communicating receptacles adapted to contain liquid, a rotatable screen in one of the receptacles, means cooperating with the screen to cause a downward current of the liquid and solid particles into the second receptacle, and means for preventing interruption of the current by backward flow of the liquid.

17. In an apparatus for removing solid particles from liquid containing the same, the combination of communicating receptacles adapted to contain liquid, a rotatable screen in one of the receptacles, means cooperating with the screen to cause a downward current of the liquid and solid particles into the second receptacle, and a liquid return conduit for preventing interruption of the current by backward flow of the liquid.

18. In an apparatus for removing solid particles from liquid containing the same, the combination of communicating receptacles adapted to contain liquid, a rotatable screen in one of the receptacles, means cooperating with the screen to cause a downward current of the liquid and solid particles into the second receptacle, means for preventing interruption of the current by backward flow of the liquid, and means for withdrawing the solid particles from the second receptacle.

19. The method of separating solid particles from liquid containing the same, which comprises screening the liquid and maintaining a hydrostatic head exteriorly of and at the surface of the screen so that the downward current of liquid thus created below the surface of the liquid sweeps the solid particles therefrom.

20. The method of separating solid particles from liquid containing the same, which comprises screening the liquid, maintaining a hydrostatic head exteriorly of and at the surface of the screen so that the current of liquid thus created below the surface of the liquid sweeps the solid particles downwardly therefrom, settling the solid particles and withdrawing liquid from the solid particles by decantation to avoid interference with the current.

21. The method of separating solid particles from liquid containing the same, which comprises successively screening the liquid, permitting the solids to settle in a body of the liquid, decanting the liquid and returning the decanted liquid for further screening without disturbing the settling of the solids.

22. The method of separating solid particles from liquid containing the same, which comprises successively screening the liquid in a screening chamber and permitting the solids to settle in a body of the liquid in a settling chamber, and facilitating the transfer of solid particles from the screening to the settling chambers by maintaining a hydrostatic head and thereby inducing a current into the settling chamber.

23. The method of separating solid particles from liquid containing the same, which comprises successively screening the liquid in a screening chamber and permitting the solids to settle in a body of the liquid in a settling chamber, facilitating the transfer of solid particles from the screening to the settling chambers by maintaining a hydrostatic head and thereby inducing a current into the settling chamber, and decanting and returning the liquid for further screening without disturbing the settling of the solids.

24. In an apparatus for removing solid particles from liquid containing the same, the combination of a rotatable screen, means cooperating therewith to direct a current of liquid therefrom and means to limit the travel of scum rising to the surface of the liquid and moving with the current.

25. In an apparatus for removing solid particles from liquid containing the same, the combination of a rotatable screen, means cooperating therewith to direct a current of liquid therefrom and a baffle immersed in the liquid to limit the travel of scum rising to the surface of the liquid and moving with the current.

26. In an apparatus for removing solid particles from liquid containing the same, the combination of a rotatable screen, a receptacle in which the screen rotates, a plurality of fixed baffles spaced apart in parallel relation and cooperating with the screen to prevent accumulation of solid particles thereon by the sweeping action of a current of the liquid.

In testimony whereof I affix my signature.

FRANK BACHMANN.